(12) United States Patent
Devers

(10) Patent No.: US 6,938,902 B2
(45) Date of Patent: Sep. 6, 2005

(54) BOOT WITH O-RING SEAL

(75) Inventor: Richard Allen Devers, Linwood, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/375,509

(22) Filed: Feb. 26, 2003

(65) Prior Publication Data

US 2004/0164500 A1 Aug. 26, 2004

(51) Int. Cl.$^7$ ................................................ F16J 15/52
(52) U.S. Cl. ........................ 277/634; 277/635; 277/636
(58) Field of Search ................................ 277/634, 635, 277/636, 641

(56) References Cited

U.S. PATENT DOCUMENTS

| | | | |
|---|---|---|---|
| 5,172,793 A | * | 12/1992 | Temple et al. .............. 188/72.4 |
| 6,406,034 B1 | | 6/2002 | Alcantara et al. |
| 6,543,746 B2 | | 4/2003 | Bircann et al. |
| 2002/0101042 A1 | * | 8/2002 | Jarrus ........................... 277/635 |
| 2004/0036231 A1 | * | 2/2004 | Neviani ........................ 277/634 |

FOREIGN PATENT DOCUMENTS

FR WO 02/50442 A1 * 6/2002

* cited by examiner

Primary Examiner—Enoch Peavey
(74) Attorney, Agent, or Firm—Michael D. Smith

(57) ABSTRACT

A boot with O-ring seal for sealing around an article such as a universal joint housing includes a boot having a hollow body adapted to tightly receive the article. An O-ring extends lengthwise within an internal annular groove in the body. The O-ring, in its natural free state condition, has a radial dimension which is greater than the depth of the groove so that when the article is received in the body the O-ring is deformed and makes sealing contact with the article. The O-ring, in its natural free state condition, has an axial dimension which is less than the width of the groove by an amount such that when the article is received in the body and the O-ring makes sealing contact with the article, the O-ring is deformed into the space between the side walls of the groove.

10 Claims, 2 Drawing Sheets

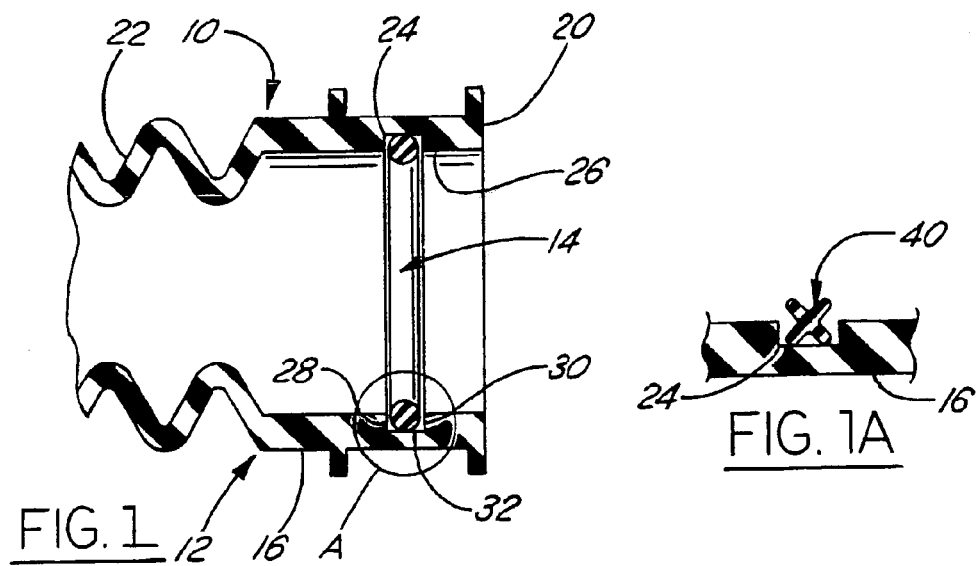
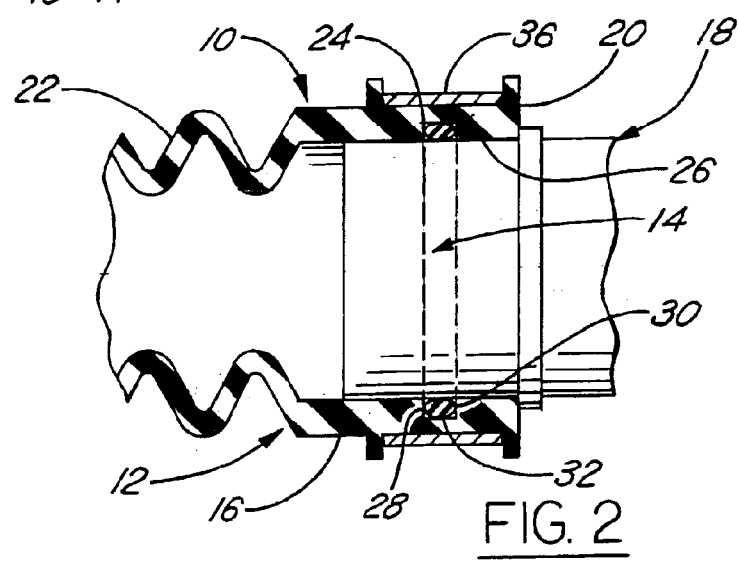
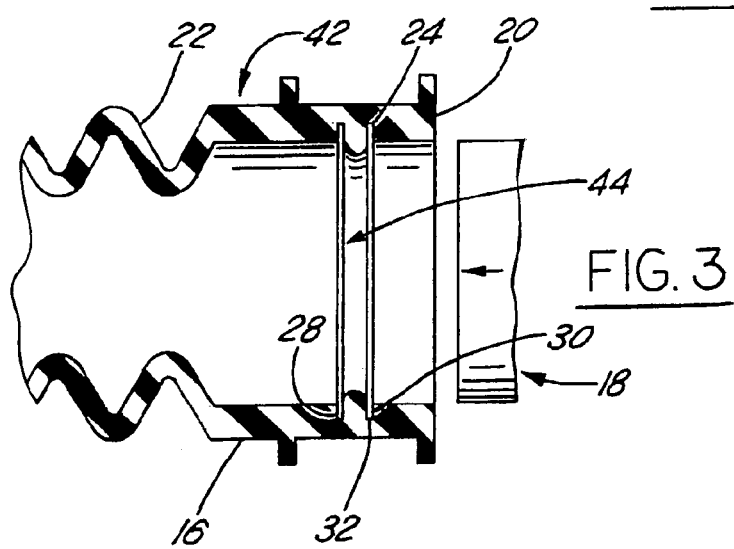

BOOT WITH O-RING SEAL

TECHNICAL FIELD

This invention relates generally to boots for sealing around an article such as a universal joint housing.

BACKGROUND OF THE INVENTION

Current practice for sealing around an article such as a universal joint housing is to place the article in a boot and apply clamping pressure on the outside of the boot to make a seal between the inside of the boot and the outside of the article. The boot is typically made of a thermosetting or a thermoplastic rubber-like material. Such materials are essentially non-compressible. When clamping pressure is applied, the boot material may move or deflect, but it does not significantly compress. Consequently, it is difficult to make a good seal between the boot and the article.

SUMMARY OF THE INVENTION

In accordance with the present invention, an O-ring is incorporated into the boot. Preferably the O-ring is seated in a groove in the inner surface of the boot. The O-ring, in its natural free state condition, has a radial dimension greater than the depth of the groove so that when the article is received in the boot the O-ring is deformed to make continuous sealing contact with the article. Preferably the groove is wider than the axial dimension of the O-ring in its natural free state condition, so that the O-ring will be deformed into the space between the side walls of the groove.

The cross-section of the O-ring may be circular or it may be of any other desired shape.

The boot and O-ring may be separately formed or they may be molded as one piece. If separately formed, the O-ring can be made of a different material than the boot, having a lower modulus of elasticity and a lower durometer or hardness.

The boot of this invention can be used for sealing around non-round articles or full-round articles.

One object of this invention is to provide a boot and O-ring seal having the foregoing features and capabilities.

Another object of the invention is to provide a boot and O-ring seal which is of simple construction yet highly successful in the accomplishment of its intended function.

These and other objects, features and advantages of the invention will become more apparent as the following description proceeds, especially when considered with the accompanying drawings.

BRIEF DESCRIPTION OF THE DRAWINGS

The present invention will now be described, by way of example, with reference to the accompanying drawings, in which:

FIG. 1 is a sectional view of a boot with O-ring seal constructed in accordance with the invention;

FIG. 1A is a fragmentary view of a portion of FIG. 1 within circle A, showing an O-ring of a different cross-section;

FIG. 2 is a sectional view similar to FIG. 1, showing an article inserted in the boot;

FIG. 3 is a sectional view similar to FIG. 1, but shows a modification of the invention;

DESCRIPTION OF THE PREFERRED EMBODIMENT

Figure 4:
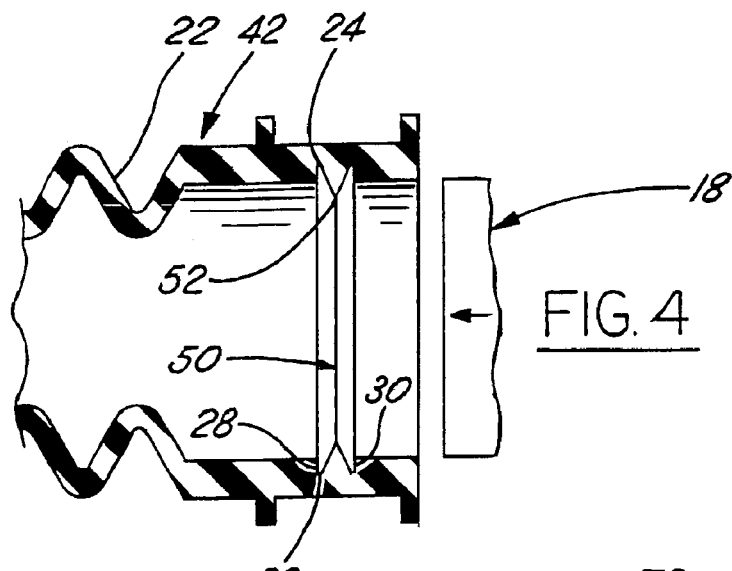
FIG. 4 is a sectional view similar to FIG. 1, but shows another modification.

Referring now more particularly to the drawings, there is shown in FIGS. 1 and 2 a seal assembly 10 which includes a boot 12 and a circular O-ring 14. The boot 12 and the O-ring 14 may be made of any suitable material including but not limited to various thermosets such as Nitrile, Neoprene and silicone, various thermoplastics such as Santoprene and Hytrel, urethane materials, and natural rubber.

The boot 12 has a cylindrical hollow body 16 of circular cross-section which is adapted to tightly receive an article 18 inserted into the body through the open end 20 thereof. The boot 12 also has a corrugated or accordion-like tubular extension 22 at the opposite end. If, for example, the article 18 happens to be a cylindrical universal joint housing with a rod projecting from the housing, then the tubular extension 22 would seal around the rod.

The body 16 has an internal, annular, circumferentially extending, endless circular groove 24 in a cylindrical inner surface 26 of the body. The groove 24 is perpendicular to the lengthwise dimension of the body. The groove 24 is of uniform depth throughout its length and has spaced apart, parallel side walls 28 and 30 and a bottom wall 32 extending between the side walls.

The O-ring 14 in FIGS. 1 and 2 is formed separately from the boot 12 and is circular and of the same outer diameter as the groove 24 so that the O-ring, in its natural, unstressed, free state condition, fits in the groove in light contact with the bottom wall 32 of the groove. The O-ring 14 is circular in cross-section and in its natural, unstressed, free state condition shown in FIG. 1, has a radial dimension which is greater than the depth of the groove 24. When the article 18 is inserted in the body 16 of the boot 12, and a band-like clamp 36 is tightened around the body as in FIG. 2, the article 18 will be tightly held in the body 16 of the boot and the O-ring will be deformed and make continuous sealing contact with the article. Also, the axial dimension of the unstressed O-ring 14 is less than the width of the groove 24 measured between the side walls 28 and 30 (FIG. 1) so that when the article 18 is tightly received in the body 16 of the boot as in FIG. 2 and the O-ring makes continuous sealing contact with the article, the O-ring will be deformed into the space between the side walls of the groove.

FIG. 1A is a view of a portion of the body 16 in FIG. 1, showing an O-ring 40 which is like the O-ring 14 previously described except that it is generally X-shaped in cross-section. Like the O-ring 14, the O-ring 40, when the article 18 is inserted in the body 16 of the boot and the clamp 36 is tightened around the body, will be deformed into the space between the side walls of the groove 24.

FIG. 3 shows a modified seal assembly which differs from the seal assembly in FIGS. 1 and 2 in that the O-ring is formed integrally and of one piece with the boot rather than separately from the boot. Thus in FIG. 3, the seal assembly includes a boot 42 having an integral O-ring 44. The boot 42 is like the boot 12 and corresponding parts bear the same reference numerals. The O-ring 44 is integral with the bottom wall 32 of the groove 24 and extends continuously throughout the full length of the groove. The O-ring 44 is arcuate in cross-section and in its natural, unstressed, free state condition shown in FIG. 3, has a radial dimension which is greater than the depth of the groove 24. When the article 18 is inserted in the body 16 of the boot, and a clamp such as the clamp 36 shown in FIG. 2 is tightened around the body, the article will be tightly held in the body 16 of the boot and the O-ring 44 will be deformed and make continuous sealing contact with the article in the same manner as previously described in connection with FIGS. 1 and 2. The axial dimension of the unstressed O-ring 44 is less than the width of the groove 24 by an amount such that when the article 18 is tightly received in the body of the boot and the O-ring is deformed into the space between the side walls 28, 30 of the groove. The sealing function does not depend on contact with the side walls of the groove.

FIG. 4 shows a further modification which differs from the modification of the FIG. 3 only in the cross-sectional configuration of the O-ring. Thus in FIG. 4, the O-ring 50 is V-shaped and has a radial dimension measured from the bottom of the groove 24 to the apex 52 of the O-ring which is greater than the depth of the groove. Thus when the article 18 is inserted in the body of the boot in FIG. 4 and a clamp such as the clamp 36 shown in FIG. 2, is tightened around the body to tightly hold the body in the boot, the O-ring will be deformed and make continuous sealing contact with the article. The axial dimension of the O-ring measured across its base where it is integrally connected to the bottom wall of the groove is less than the width of the groove, but when the article is tightly received in the body with the O-ring in continuous sealing contact with the article, the V-shaped O-ring will be deformed into the space between the side walls 28 and 30 of the groove.

Figure 5:
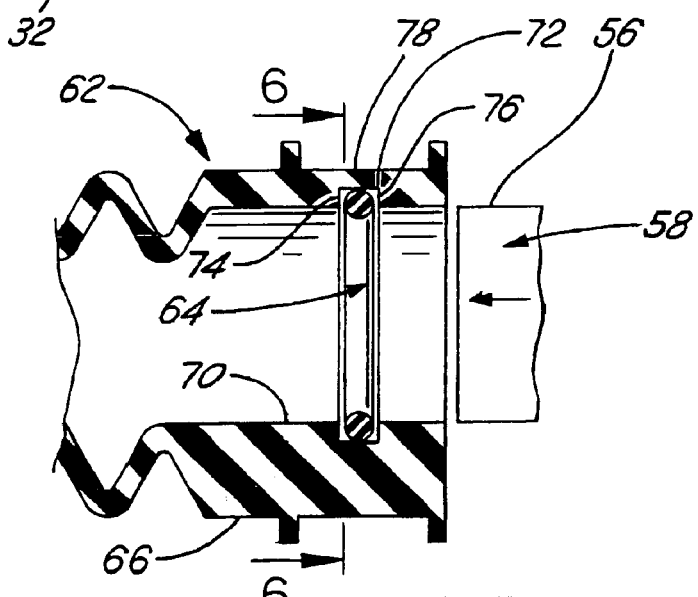
FIG. 5 is a sectional view taken on the line 5—5 in FIG. 6, and shows a further modification.
Figure 6:
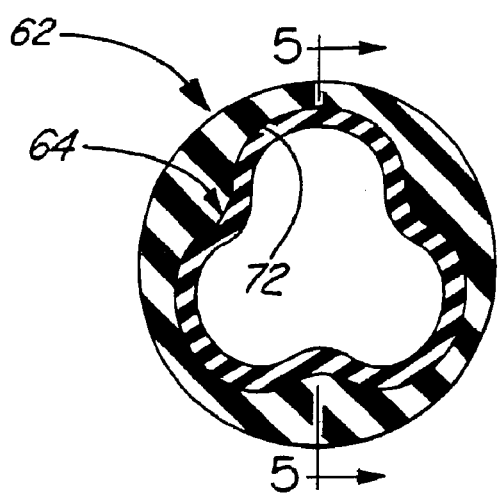
FIG. 6 is a sectional view taken on the line 6—6 in FIG. 5.

FIGS. 5 and 6 show a further modification of the seal assembly which is adapted to seal around a non-circular trilobal surface 56 of an article 58. The seal assembly in FIGS. 5 and 6 includes a boot 62 and an O-ring 64. The boot 62 has a cylindrical body 66, but the hollow interior of the body, that is, its inner surface 70, instead of being circular, is of the same non-circular trilobal shape as the surface 56 of the article 58. An internal, annular, circumferentially extending, endless groove 72 is formed in the inner surface 70 of the body and follows the non-circular trilobal contour of the inner surface 70. The groove 72 is perpendicular to the lengthwise dimension of the body, is of uniform depth throughout its length, and has spaced apart parallel side walls 74 and 76 and a bottom wall 78 extending between the side walls.

The O-ring 64 is circular in cross-section, is formed separately from the boot and in its natural, unstressed, free state condition, is of the same non-circular shape as the groove and fits in the groove in light contact with the bottom wall of the groove.

When the article 58 is inserted in the body 66 of the boot 62, and a clamp such as the clamp 36 shown in FIG. 2 is tightened around the body, the article will be tightly held in the body of the boot and the O-ring 64 will be deformed and make continuous sealing contact with the article. Also, the axial dimension of unstressed O-ring 64 is less than the width of the groove 72 measured between the side walls 74 and 76 so that when the article is tightly received in the body of the boot and the O-ring makes continuous sealing contact with the article, the O-ring will be deformed into the space between the side walls of the groove.

What is claimed is:

1. A boot assembly for sealing around an article, comprising:
    a boot having a hollow body with an axially extending circumferential inner surface portion operative to tightly engage the article when received in said body against said inner surface;
    an internal annular groove of predetermined depth extending into said inner surface, said inner surface on either side of said grove lying substantially in a common plane when viewed in axial section;
    an O-ring disposed in said groove and having a radial dimension in a natural free state condition which is greater than the depth of said groove such that a radially inner-most surface said O-ring is extended out of said groove beyond said plane of said inner surface of said body, said groove having side walls that are axially spaced relative to said O-ring such that said O-ring is deformable substantially fully into said space of said groove so that the radially inner most surface of said O-ring is positionable substantially in the plane of said inner surface of said boot.

2. The boot with O-ring seal of claim 1, wherein said O-ring is formed separately from said boot.

3. The boot with O-ring seal of claim 2, wherein said O-ring is circular in cross-section.

4. The boot with O-ring seal of claim 2, wherein said O-ring is generally X-shaped in cross-section.

5. The boot with O-ring seal of claim 1, wherein said O-ring is made of one piece with said boot.

6. The boot with O-ring seal of claim 5, wherein said O-ring is half round in cross-section.

7. The boot with O-ring seal of claim 5, wherein said O-ring is generally V-shaped in cross-section.

8. The boot with O-ring seal of claim 1 for sealing around a non-circular surface of an article such as a universal joint housing, wherein said hollow body has a non-circular circumferentially extending, annular inner surface portion corresponding in shape to the non-circular surface of the article and adapted to tightly receive the non-circular surface of the article, and said O-ring, in its natural free state condition, is of the same non-circular shape as said non-circular surface of the article when the article is tightly received in the body.

9. The boot with O-ring seal of claim 8, wherein said annular groove is of the same non-circular shape as said non-circular surface of the article.

10. The boot with O-ring seal of claim 9, wherein said O-ring is formed separately from said boot.

* * * * *